N. DAVIS.
CLOTH MEASURING MACHINE.
APPLICATION FILED JUNE 25, 1917.

1,266,923.

Patented May 21, 1918.
5 SHEETS—SHEET 3.

INVENTOR,
Nathan Davis
BY David Lichtenstein
ATT'Y.

N. DAVIS.
CLOTH MEASURING MACHINE.
APPLICATION FILED JUNE 25, 1917.

1,266,923.

Patented May 21, 1918.
5 SHEETS—SHEET 5.

INVENTOR,
Nathan Davis
BY David Lichtenstein
ATT'Y.

UNITED STATES PATENT OFFICE.

NATHAN DAVIS, OF BOSTON, MASSACHUSETTS.

CLOTH-MEASURING MACHINE.

1,266,923. Specification of Letters Patent. Patented May 21, 1918.

Application filed June 25, 1917. Serial No. 176,663.

*To all whom it may concern:*

Be it known that I, NATHAN DAVIS, a citizen of the United States, residing at Boston, in the county of Suffolk and State of Massachusetts, have invented a new and useful Improvement in Cloth-Measuring Machines, of which the following is a specification.

This invention relates to cloth-measuring machines, and has for its object to provide a simple and efficient power or hand-operated apparatus whereby cloth may be accurately measured as it is being fed through the machine and the amount thereof registered.

Another object is to provide a cloth-measuring machine which will treat any grade of material without subjecting the same to undue strain or in any way affecting the weave or the texture thereof, registering the amount fed through the machine and allowing for the cutting off and severing of the measured portion from the stock.

Another object is to provide a cloth-measuring machine embodying the above-mentioned purposes, which is designed with an automatic registering device adapted to operate and register only while the machine is supplied with goods which is being fed therethrough, and otherwise to remain inoperative and non-registering regardless as to whether the feeding mechanism of the machine is being operated or not.

Still another object is to provide a machine of the character described, which is designed to automatically stop when operated by electric power when the run of material to be measured has been fed through the machine.

Referring to the accompanying five sheets of drawings—

Fig. 14 represents a view taken on line 14—14 Fig. 1 showing the register trip mechanism in the "normal" position, as when material is supplied and being fed through the machine, as shown in Fig. 1.

Fig. 15 represents the same view as Fig. 14 but shows the recorder trip mechanism shifted in the non-recording position, as occurs when no material is supplied or being fed through the machine, corresponding to the view shown in Fig. 2.

Fig. 16 represents diagrammatically a plan and elevational view corresponding thereto, showing the recorder trip mechanism supported in the "normal" position by the material which is being fed, or to be fed, through the machine.

Fig. 17 represents the same view as Fig.

16 but shows the end of the material advanced in the machine beyond the rear co-acting supporting element of the trip mechanism.

Fig. 18 represents the same view as Fig. 16 but shows the rear or extreme end of the material being fed through the machine entirely in advance of the trip mechanism, and hence the latter is shown down with the register mechanism set in the inoperative or unclutched position.

Like numerals refer to like parts throughout the several views of the drawings.

Figure 1:
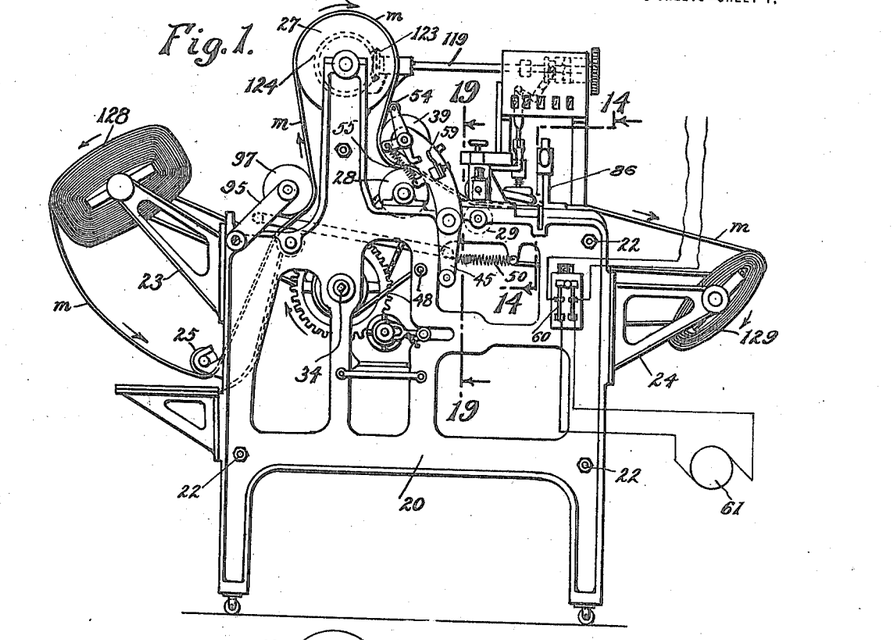
Figure 1 represents a front elevational view of my machine showing the operating side of the same; the machine feeding material from an unwinding bolt, through the machine where it is measured and registered, and then on to a winding bolt.

The numeral 20 represents the front frame-member of the machine, 21 the rear frame-member, and 22 the tie-rods which rigidly secure said frame-members together. 23 represents the unwinding bolt-supporting-brackets, and 24 the winding bolt-supporting brackets which are rigidly secured to the ends of the machine as shown. Rotatably mounted between the frames 20 and 21 are the removable guide-roller 25 Fig. 4, the idler-roller 26, the wrapping or winch-roller 27, the main feed-roller 28, and the auxiliary feed-roller 29; the rollers 27, 28 and 29 being preferably driven at the same peripheral rate of speed by means of the chain-drive 30 Figs. 4 and 6, the chain drive 31 and the friction-belt-drive 32, respectively. The latter drive may also be a chain-drive if desired. The driving members of the aforesaid drives are secured on the main drive-shaft 33 of the machine and are adapted to operate therewith; said drive-shaft 33 projects through the front frame 20 of the machine as shown in Figs. 1 and 6 and terminates in a square section 34, which may be used to fit a crank for the purpose of driving or otherwise manipulating the machine by hand when desired. The drive-shaft 33 is also provided with the pulleys 35 and 36 which operate the belts 37 and 38 for turning the winding and unwinding bolt-supporting mechanisms of the machine, respectively (Fig. 3).

Figure 2:
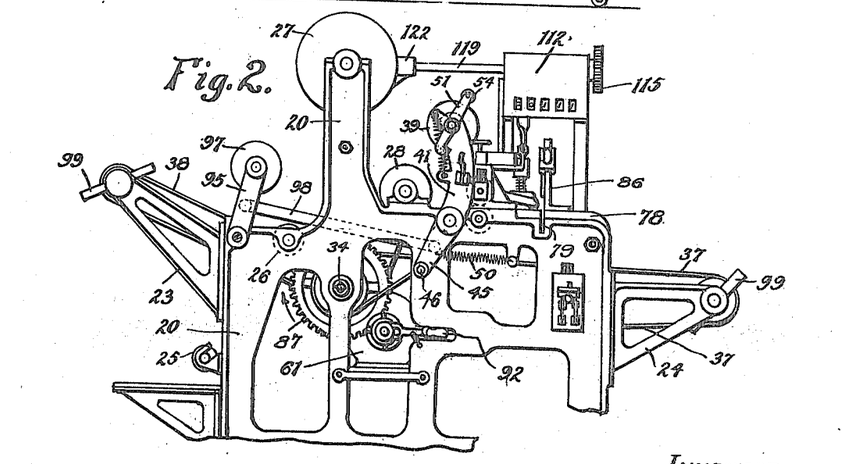
Fig. 2 represents the same view as Fig. 1 but shows the machine without any material feeding therethrough and with the feeding mechanism open and ready to receive the new supply of material.
Figure 4:
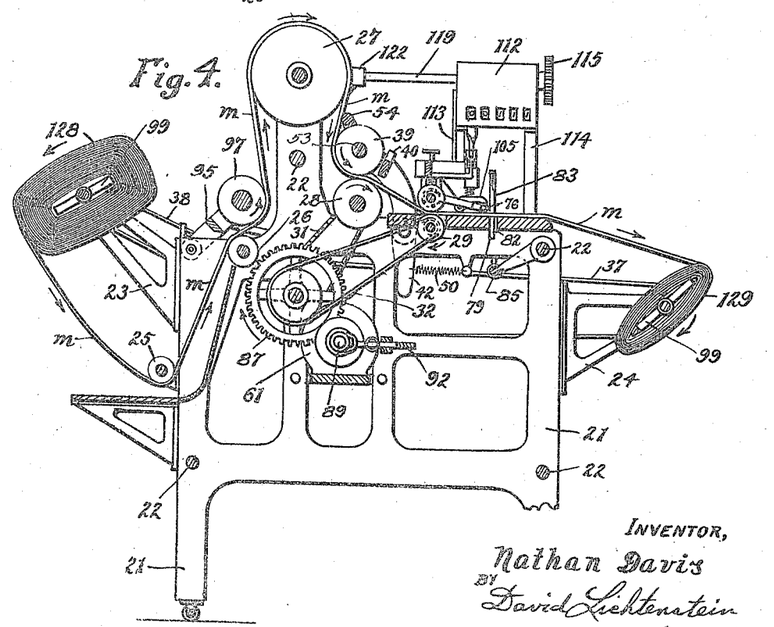
Fig. 4 represents a similar view to Fig. 1 but shows the front frame mechanism of the machine removed therefrom.
Figures 5, 6, 7, 8, 9:
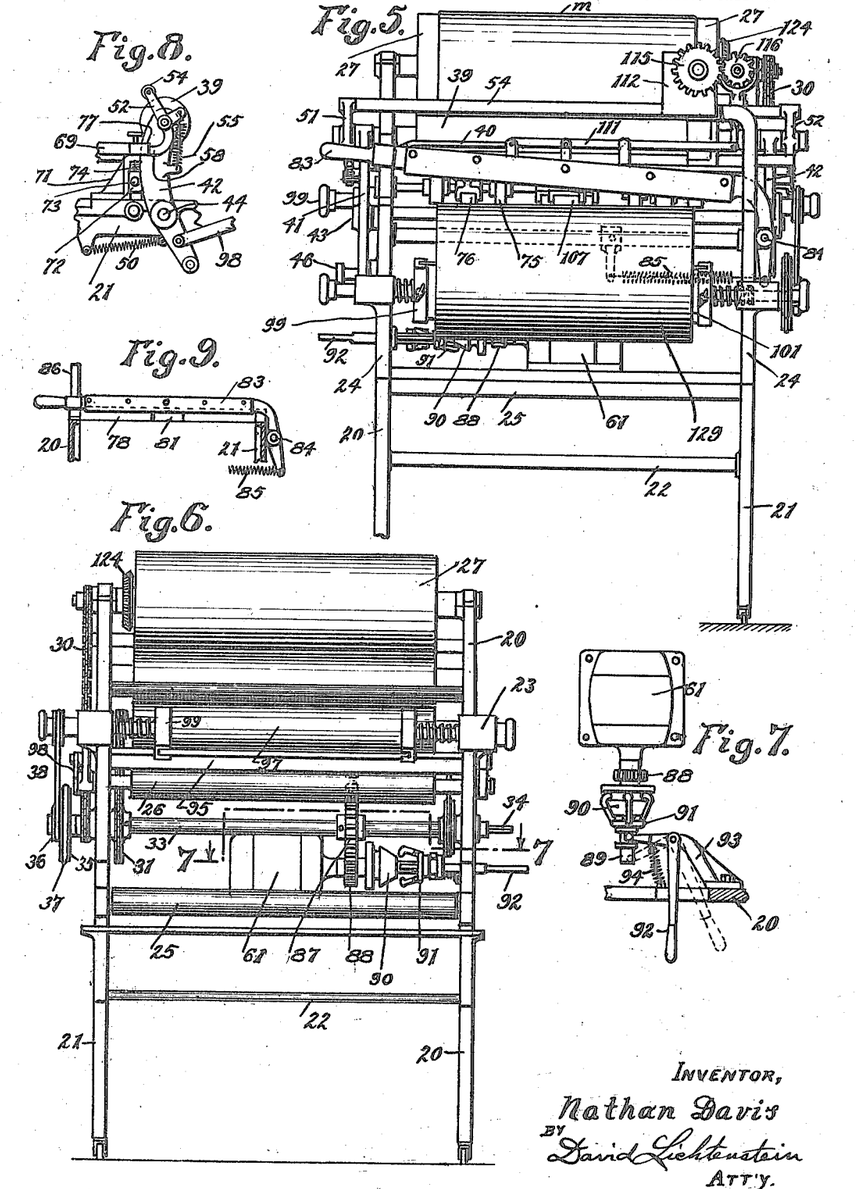
Fig. 5 represents a right end view or the cutting end of the machine shown in Fig. 1.
Fig. 6 represents a left end view or the supply end of the machine shown in Fig. 1, no material being shown in the machine.
Fig. 7 represents a sectional view taken on line 7—7 in Fig. 6 looking in the direction of the arrows, but shows the friction clutch set in operating position for driving the mechanism with the motor.
Fig. 8 represents a view showing the rear side of the automatic switch-tripping mechanism of the machine, showing the frictional feeding-roller-bracket shifted to the "open" position, corresponding to that shown in Fig. 2 when the auxiliary electric circuit of the tripping mechanism is broken.
Fig. 9 represents a part of the view shown in Fig. 5 but shows the cutter lowered for severing the cloth measured by the machine from the rest of the bolt.
Figure 10:
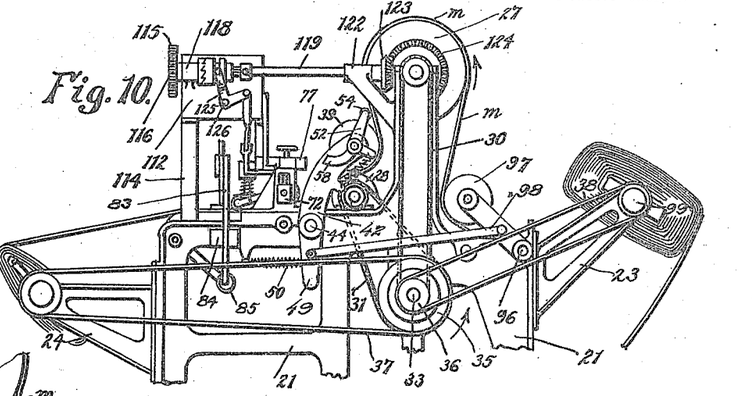
Fig. 10 represents a rear view of the machine.
Figure 11:
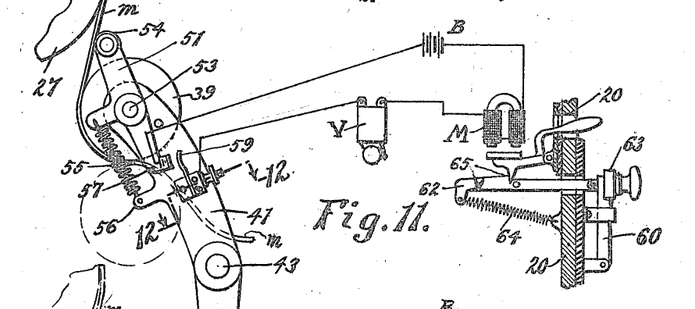
Fig. 11 represents a diagrammatic view showing the automatic trip-roller mechanism of the machine enlarged and the main switch which is automatically opened thereby; the latter being shown closed with the trip-roller mechanism in "normal" position, when the auxiliary circuit is "open".
Figures 12, 13:
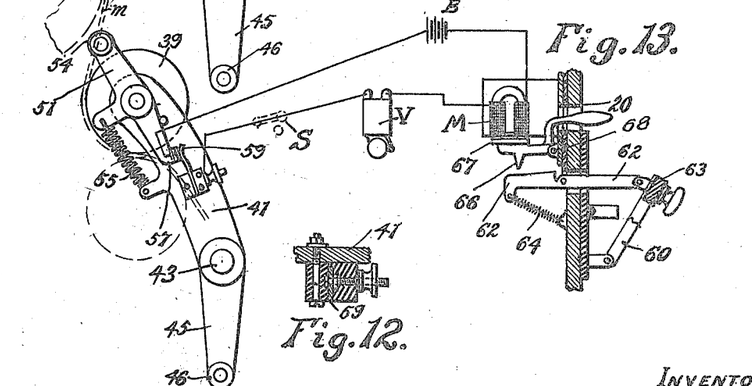
Fig. 12 represents a sectional view taken on line 12—12 in Fig. 11 looking in the direction of the arrows.
Fig. 13 represents the same view as Fig. 11 but shows the auxiliary circuit "closed" with the main switch "open".
Figure 19:
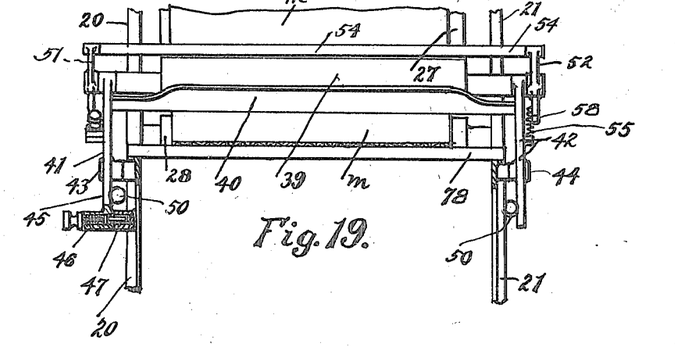
Fig. 19 represents a view taken on line 19—19 Fig. 1, looking in the direction of the arrows.

39 Fig. 4 represents the main co-acting frictional feed-roller which is rotatably mounted and free to turn in the rigid and oscillating yoke-member 40, as shown in Fig. 19; said yoke-member having the side members 41 and 42 thereof pivotally secured at 43 and 44 to the frame-members 20 and 21, respectively. The shifting-arm 45 of the side 41 is provided with the shifting and locking handle 46 of which the plunger type of locking-pin 47 Fig. 19 is adapted to fit within the locking hole 48 provided for the purpose in the frame-member 20 when the yoke-member 40 is shifted to the non-working position, as shown in Fig. 2. The projecting-arm 49 Fig. 10 of the side 42 of the yoke-member 40 and the shifting-lug 45 of the side 41 are both provided with the compression springs 50 which are secured to the frame-members of the machine for frictionally forcing the frictional feed-roller 39 into working engagement with the main feed-roller 28 of the machine, as shown in Fig. 1. The sides 41 and 42 of the yoke-member 40 are provided with the trip-rod brackets 51 and 52 Figs. 5 and 19 respectively which are rigidly secured to the shaft 53 on which the roller 39 is free to turn. Said brackets 51 and 52 rotatably support between them the trip-roller 54 which normally frictionally engages with the material "m" (which is being fed through the machine) by the action of the compression springs 55 Fig. 8 which are secured at 56 to lugs provided on the sides 41 and 42 of the yoke-member 40 for the purpose. The bracket 51 is provided with the ground-lug 57 (Fig. 11), while the bracket 52 is provided with the stop-lug 58 (Fig. 8). The side member 41 carries secured thereto the contact member 59 which is thoroughly insulated from the yoke-member and is electrically connected with the auxiliary electric circuit of the machine which comprises the battery "B" and magnet "M" and preferably the vibrating bell "V" as shown in the diagrams of Figs. 11 and 12. The front frame 20 of the machine is provided with the main switch 60 (Fig. 1) which connects with the motor 61 and the supply mains, as indicated in Fig. 1. The main switch 60 is provided with the bar-member 62 Fig. 25 which is pivotally connected with the bridge of the switch 63 and thoroughly insulated from the switch member itself and protrudes through an opening in the frame-member 20 and in back thereof, as shown in Figs. 11 and 12 where a spring 64 is employed as shown in connection therewith. The bar 62 is provided with the stop-lug 65 against which the stop-lug 66 of the magnet-bar 67 sets when the switch 60 is closed as shown in Fig. 11 and no contact is made between the ground-lug 57 and the contact member 59. The magnet-bar 67 may be pivoted at 68 Fig. 13 to a bracket member supporting the magnet "M". The spring 64, when the switch 60 is closed, as shown in Fig. 11, is held under compression and immediately upon the release of the magnet-bar-lug 66, as shown in Fig. 13 (which occurs when the magnet "M" becomes energized by virtue of the contact made between the ground-lug 57 and the contact-member 59, Fig. 13) forces the switch member 60 to spring open and stops the motor 61 of the machine, and thus consequently stops the machine.

Figure 3:
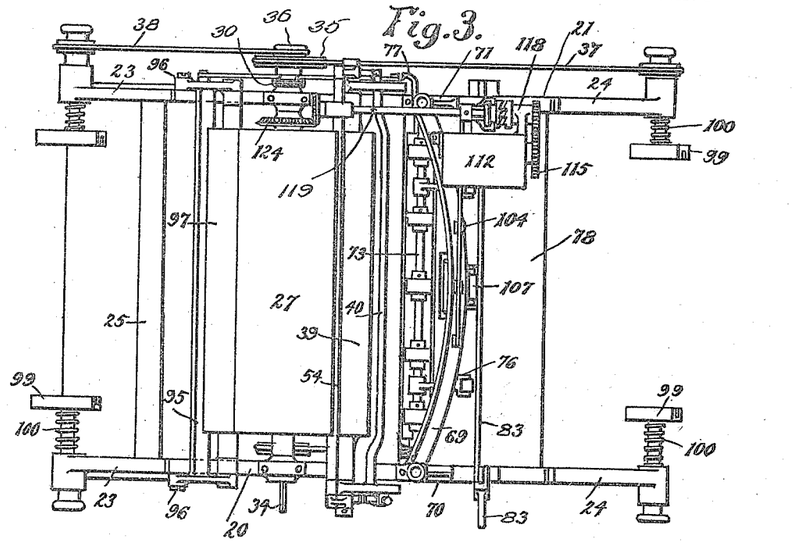
Fig. 3 represents a plan view of Fig. 1 but shows the machine without any material in it.

69 Fig. 3 represents a rigid bridge member which preferably terminates in the standards 70 and 71 which are rigidly secured to the frame-members 20 and 21, respectively. The standards 70 and 71 are provided with the journal-bearings 72 Fig. 8 which rotatably support the friction-roller-shaft 73 Fig. 14 and which are held under tension by means of the expansion springs 74. The roller-shaft 73 carries the friction-rollers 75 Figs. 3 and 14 which are rigidly secured thereto to rotate therewith, and the tension roller-brackets 76 freely mounted thereon for frictionally guiding the fabric beyond said rollers 75. The standard 71 is provided with the projecting-lug 77 which serves as a shifting-lug for the bracket-member 52. The numeral 78 Fig. 2 represents the table or top of the machine, and the same is provided with the transverse cutter-slot 79 and the register-trip-mechanism recesses 80 and 81 Fig. 16. 82 represents a metallic cutter-strip which is set into the cutter-slot 79, as shown in Fig. 4. 83 represents the cutter-member which is pivotally secured at 84 to the frame-member 21 and is held in the normal or "up" position, as shown in Fig. 5, by means of the compression-spring 85, or by some other suitable means. The operating end of the cutter-member 83 is preferably associated with the guide-member 86 (Figs. 1 and 2) which is rigidly secured to the frame-member 20. 87 Fig. 4 represents the driving-shaft-gear and is rigidly secured to the driving-shaft 33 to operate therewith and meshes with the loose motor-gear 88 which freely fits the armature-shaft 89 of the motor 61. The gear 88 is associated and secured to operate with the friction cone 90, while the co-acting friction clutch-member 91 is slidably keyed to rotate with the armature-shaft 89. 92 represents a bell-crank type of clutch-operating lever, the handle section of which protrudes through the machine, as shown in Figs. 5 and 6, while the bell-crank section is pivotally secured to the bracket-member 93 and forks the clutching-member 91 (Figs. 6 and 7). 94 represents a compression-spring which tends to keep the clutching-member 91 disengaged from the co-acting friction cone 90.

95 represents a yoke-member which is pivotally secured to the frame-members 20 and 21 at 96 and rotatably supports the friction-roller 97, as shown in Fig. 1. 98 Fig. 2 represents the coupling-bar which is pivotally secured to said yoke-member 95 and the friction feed-roller yoke-member 40.

99 represents the bolt-supporting brackets which are rotatably and slidably mounted in the bolt-supporting members 23 and 24 and are provided with expansion-springs 100 for allowing slidable adjustment for said bolt-supporting brackets to accommodate a variety of widths of bolts, the brackets 99 being forked as shown for the purpose of including the bolt-board 101, as shown in Fig. 5; it being understood that while in Fig. 5 the bolt-boards are shown projecting beyond the edges of the material, as a matter of fact the usual length of board is the same as the width of the material, and in that event the forked bracket-members 99 will also serve to support the bolt-boards to equal advantage.

Figures 14, 15, 16, 17, 18:
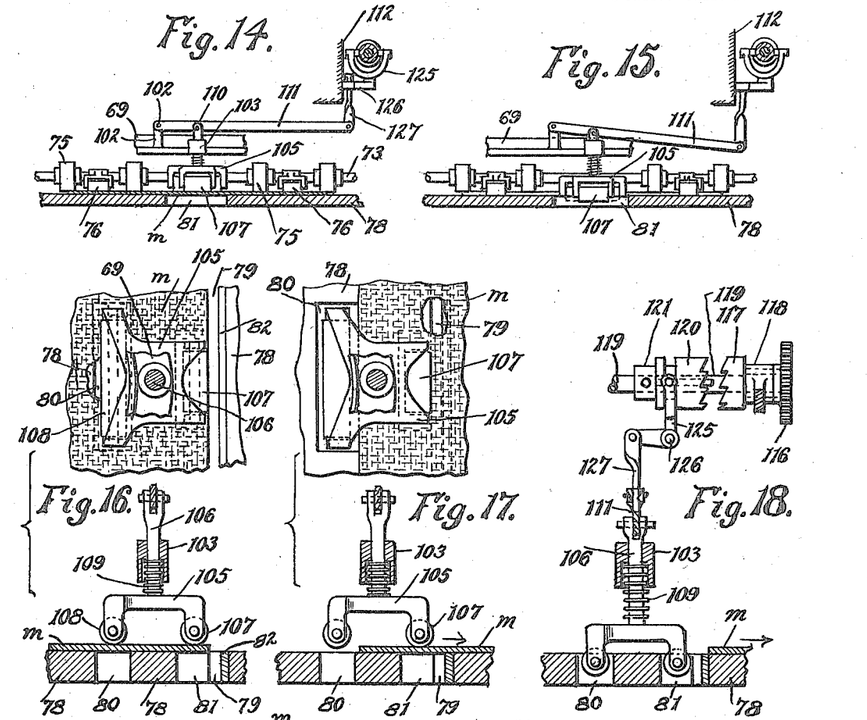

The bridge-member 69 is provided with the fulcruming-lugs 102, Fig. 14 the register-tripping-member-bearing 103, and the guide-lugs 104 Fig. 13. 105 is the register-tripping-member-frame which is provided with the upright guide-member 106 which slidably fits within the bearing 103 provided therefor on the bridge-member 69. The register-tripping-member 105 is also provided with the short or front supporting-roller 107, the long or rear supporting roller 108, and the expansion-spring 109, as shown in Fig. 16. The upright member 106 is pivotally secured at 110 to the register-operating-bar 11, Figs. 14 and 15.

112 represents the register device for the machine which is preferably of the ordinary type showing the aggregate amount of material fed through the machine. The same may be supported in any suitable manner, as by means of the brackets 113 and 114 and rigidly secured in position with the machine. 115 Figs. 3 and 5 represents a recorder-gear which is operated by the gear 116 which is secured to the spiral-clutch-member 117 Fig. 18 or made integral therewith and rotatably supported in the bearing 118 provided therefor on the register-member 112; said gear-member 116 being rotatably mounted and free to turn on the recorder-operating-shaft 119. 120 represents the shifting-clutch-member which is keyed to said register-operating-shaft 119 and adapted to slide thereon and to rotate therewith. 121 represents a stop-collar which is secured to the shaft 119. 122 Figs. 1 and 2 represents a bearing for said shaft 119, and 123 represents a gear secured to said shaft 119 to turn therewith, and is driven by the register-driving-gear 124 which is secured to rotate with the wrapping or winch-roller 27. The ratio of the register-gears 123 and 124 and the gears 116 and 115 may be proportioned to suit conditions, depending upon the type of register used and upon whether the same is to register inches or fractions of a yard or yards as units,—it being here observed that since the wrapping or winch-roller 27 and the main feed-roller 28 are operated to run with the same peripheral rate of speed, that the register being operated by the action of the wrapping or winch-roller, will consequently register the amount of material passing the feed-rollers of the device; it being also observed in that regard that the wrapping or winch-roller 27 operates whenever the main feed-roller 28 operates, and that the two always operate simultaneously.

125 represents the clutch-shifting-bell-crank-member which is pivotally secured to the register-member 112 at 126 and connects with the register-operating-bar 111 by means of the connecting-link 127 (Fig. 18). 128 represents the unwinding-bolt to be measured, while 129 represents the winding-bolt of measured material.

Having thus described the parts of my invention in detail, the manner in which the same may be employed is as follows:

First, it will be observed that with the operating-lever 92 shifted to the dotted position shown in Fig. 7, that whether the main switch 60 is closed or open, the feeding-members of the machine will be at rest. When the main switch-member is "closed" however, the motor 61 will be operating but with the clutching-member 90 disengaged, as shown in Fig. 6; the loose gear 88 will be at rest and therefore will have no effect on the driving-gear 87, and consequently the machine will not operate. On the other hand, when the main-switch-member 60 is "open," as shown in Fig. 13, the motor 61 will be at rest; and thus whether the operating-clutch on the motor-shaft 89 is engaged or disengaged, the machine will be at rest,—it being preferred, when it is desired that the machine shall be at rest, that the main switch 60 be opened and the clutching mechanism of the motor-shaft 89 be unclutched, the latter being accomplished by the shifting of the lever 92 to the dotted position shown in Fig. 7.

With the machine at rest, the friction-rollers 39 and 97 are shifted to the "open" position shown in Fig. 2 by the shifting of the yoke-member 40 to the position shown in said Fig. 2, in which position the locking-pin 47 of the shifting handle 46 is fitted into the locking-hole 48 provided therefor in the frame-member 20. The bolt of material to be measured, as 128, is supportingly set in the brackets 99, as shown in Figs. 1 and 4. The free end of the material on the bolt is then passed (in open form meaning stretched out transversely) between the rollers 97 and 26, then around the wrapping or winch-roller 27, then between the main feed-roller 28 and the co-acting frictional feed-roller 39, then between the auxiliary feed-roller 29 and the friction-roller 75, then under the tension or spreader rollers 76 and the register-tripping-member-rollers 107 and 108 and allowed to extend appreciably beyond the cutter-slot 79 in the first instance. The shifting and locking handle 46 of the yoke-member 40 is then released from its locked position shown in Fig. 2 and the rollers 39 and 97 are brought into working engagement with the material thus set in the machine, as shown in Figs. 1 and 4. It will thus be observed that the tripping-roller 54 becomes set against the material in the machine, as shown in Figs. 1 and 4, and that the frictional-feed-roller 39 is held in operating position with the main feed-roller 28 under the tension of the main yoke-springs 50. Also, that the material, under the register-tripping-member 105 supports the same in the "up" position, as shown in Fig. 16, against the tension of the expansion-spring 109 and results in closing the clutching mechanism on the register-operating-shaft 119, as indicated in Figs. 1 and 18. The register mechanism is preferably of the one-way operating type; that is to say, the turning of the gear 115 in one direction responding to the action of the driving-gear 124 when turning in the advancing or feeding direction, will cause the register device to register, while the turning of the gear 124 in the opposite direction (which, when the clutch-member on the operating-shaft 119 is closed, may cause said gear 115 to also turn in the opposite direction as when it is necessary to back up the goods in the machine) will not cause the register device to register. So that, with the goods thus set in the machine, as just described, and with the forward and leading end of the material projecting beyond the cutting-slot, which is the point at which the register device is set to register, it becomes necessary, in order that the material in advance of said cutting-slot shall be accounted for by the register, to draw the material back through the machine so that the forward and leading end of the same will assume a position at the cutting-slot, which is the point of registration for the machine. That backing feature may be accomplished by turning the feeding mechanism of the machine in the reverse direction by means of the hand-crank fitting the square-sectioned projection 34 of the driving-shaft 33 provided thereon for the purpose. The removable roller 25 may then be set in position and the machine is thus ready to start its operations.

Through the medium of the hereinbefore mentioned hand-crank, the machine may be operated by hand, if desired; it being understood that the turning of the driving-shaft 33 in the direction of the arrow indicated in Fig. 1, will cause the goods to feed through the machine in the direction of the arrows there indicated.

It will be observed that in the normal position of the trip-rod 54 when material is properly set in the machine, no contact is made between the ground-lug 57 and the contact-member 59, as shown in Fig. 11, when the auxiliary electric circuit of the machine is "open."

Now, to start the operation of the machine on its power, (as through the medium of the motor 61) the main switch 60 is closed, as shown in Fig. 11. The operator then shifts the clutching-lever 92 from the "dotted" position shown in Fig. 7 toward the "full" position shown in said figure, in which latter position the clutching mechanism associated with the motor 61 is locked; but it will be noted that intermediate positions between the "dotted" position of the lever 92 and the "full" position shown in Fig. 7 because of the friction type of clutch used, enables the operator to control the starting speed of the machine according as he requires, and when once he feels assured that the machine is operating properly he shifts the clutch-member of the motor 61 to the extreme or "full" position, as shown in Fig. 7, when the lever 92 will remain set in said locked position. The machine, when operating, will continue to feed the material through it in the direction of the arrows indicated in Figs. 1 and 4. If it is desired to measure the entire amount or run of material in a bolt as 128, the machine after being started may continue to feed the material therethrough until the rear end of the material on the bolt is being reached, when the slackening on the section of the material gripped between the feed-rollers 28 and 39 and that wrapped around the wrapping or winch roller 27 becomes perceptible. Thereupon the sensitive trip-roller 54 (which is ordinarily supported in the normal position by the tension of the outstretched and unslackened section of fabric between said feed-rollers and the wrapping-rollers) is acted upon by the tension-springs 55 which bring the ground-lug 57 into engaging position with the contact member 59 and thus closes the auxiliary electric circuit of the machine, as shown in Fig. 13, resulting in energizing the magnet "M" as well as the vibrating bell "V" when used in the circuit. The energizing of the magnet "M" causes it to attract the magnet-bar 67 which unlatches the switch-rod 62 and subjects it to the pull of the compression-spring 64 which forces the switch-member 60 to automatically spring open as shown in Fig. 13, when the main circuit which feeds the motor 61 is "open" and the motor is caused to stop. The machine thus automatically stops with the slackened part of the fabric still remaining to be measured, since the same must pass by the measuring point of the machine, which is as hereinabove explained, at the cutting-slot of the machine in order to be accounted for by the register device of the machine. Now, to feed through the material still remaining to be measured when the machine thus stops automatically, as just described, the operator may close the main electric circuit again by closing the switch 60 and holding it closed against the action of the spring 64 until the machine has fed through the entire bolt of material, when the operator may release the switch-member 60 and the power will be cut off and the machine brought to a stop again. If the operator chooses, however, he may feed through this remaining portion of unmeasured cloth after the machine is caused to stop automatically, by the use of the hand-crank heretofore suggested, instead of using power to run the machine, as just explained.

It will now be observed that the measured material may be severed from the bolt, if desired, by the use of the cutter-member 83, which, when drawn down from the normal position shown in Fig. 5 to the position shown in Fig. 9, will sever the measured portion of the material from the unmeasured portion in the machine. It will also be observed that as long as material is in the machine and supporting the register device trip-member 105, that the register device mechanism will be set to record the amount of material passing the point of registration, namely, the cutter-slot, but that as soon as the material passes from under the rollers of said register device tripping-member 105 the register device clutch-mechanism will become automatically unclutched, as shown in Fig. 18, when no further registering of the register device will take place even though the machine proper may be operating.

It will be observed that the register device tripping-member is provided with a double set of rollers which are bridged and spaced sufficiently apart from each other so that the strain on the material supporting the same will be minimized, and that in the event that the measured material is severed from the feeding material in the machine, the rear roller 108 will serve to support the trip-member 105 so that the loose edge of the material at the cutter-slot will not have the tendency to sag into the roller-recess 81 provided in the top of the machine and thus cause the unclutching of the recorder-mechanism. Fig. 16 shows the recorder-tripping-member 105 supported by the material without any sagging taking place at the leading end of the material from which the measured portion has been severed.

It will be observed that under ordinary circumstances, if the trip-member 105 depended upon but a single roller, as roller 107 near the edge of the material, that unquestionably the tension of the trip-member 105 on the unsupported material which lies across the recess 81 would cause the material to sag and depress into said recess and result in unclutching the register-mechanism; so that when the machine would be started up a portion of the material would pass through the feed-rollers of the machine without being registered. But with the use of the rear supporting-roller 108 set sufficiently back and away from the forward roller 107, with the fabric supported between them on the top 78 of the machine as shown in Fig. 16, it is impossible for the material to sag and have any effect on the register device clutch-mechanism, which is the feature sought; and thus it will be observed that as soon as the material starts feeding the recorder will correctly register every portion of it as it passes the registering point of the machine.

It will also be observed that if desired more than two rollers may be used for distributing the strain of the tripping member on the fabric, so that at any given point of contact with the fabric the strain will be minimized; and also, that the action of the tripping-member may be absolutely positive in controlling the operations of the recorder, that is to say, in connection with setting the recorder to register while the machine is feeding material through it and by the registering section, and otherwise to unclutch and disengage the recorder when no material is being fed through the machine so that no registering occurs during such period.

It will also be observed that when the trip-roller 54 drops and causes the ground-lug 57 to make contact with the contact-member 59 and the magnet "M" becomes energized and the switch 60 is sprung open and the machine stops automatically, that if a bell, as "V," is provided in the circuit the same will be sounded and the operator's attention will be attracted to the machine. He will immediately shift the yoke-member 40 to the open position, as shown in Figs. 2 and 8, in which position the stop-lug 77, Fig. 8, will engage with the lug 58 of the trip-roller-bracket 52 and cause the ground-lug 57 to become disengaged from the contact-member 59, whereupon the auxiliary circuit will become "opened" and the bell will stop ringing and the magnet will become deënergized. It will be here noted that if desired a suitable switch (as indicated by the dotted lines marked "S" Fig. 13) may be employed in the auxiliary circuit for enabling the operator to cut out the circuit completely when the machine is not supplied with material, and when during such interval it becomes necessary for any reason to set the yoke-member 40 in any position other than the circuit-opening position indicated in said Figs. 2 and 8.

It will also be observed that the winding and unwinding bolt-members are preferably operated by friction belts, the former being allowed to unwind at a rate of speed which will provide for a loose stretch of material between it and the wrapping or winch-roller 27, so that no tension will be put on the material while the latter is allowed to run at a rate of speed which will insure a fairly tight winding of the material on the bolt, it being understood that as the goods becomes tightly wound on the bolt 129 that the belt 37 will slip and will thus tend to force a compact winding of the measured material on the bolt 129.

It will also be observed that the machine will work to equal advantage in measuring goods that is folded and not rolled in bolt form, and that the measured goods may be allowed to pass on to a counter or into a container, if desired, instead of being wound on the bolt, as shown in the drawings. Also, that the machine may be light and simple in construction and movable if desired, as by being set on suitable casters or rollers.

It will also be observed that the machine will handle any grade of fabric and fabric of any standard width, without the need for adjustment; the feeding rollers, as the frictional-feed-roller 39 and the friction-rollers 75 as well as the recorder-trip-rollers 107 and 108 being frictionally held by spring-tension, will therefore automatically and readily adjust themselves to suit conditions relative to thickness of material fed through the machine. It will also be observed that the machine is designed to handle the material with the least possible tension thereon, and to that effect it will be noted that very little tension on the material is found to exist on the supply side of the machine, the only possible chance for any tension being due to the friction that may occur from the contact of the material with the free rollers 25 and 97, but since the supply-bolt is designed to turn at a speed which will always provide for a slackening of the material, as shown in Fig. 1, the tension on the material between the wrapper or winch-roller 27 and the supply-bolt 128 becomes practically *nil*. Since the wrapping or winch-roller 27 is driven in the machine, it will advance the material wrapped around it with the least possible tension to it, and since the feed-rollers 28 and 29 are also driven at the same peripheral rate of speed as the winch-roller 27, their tendencies will be to advance the material with even tension thereon, and since the action of the co-acting friction-rollers 39 and 75, respectively, can only respond to the rate at which the material is traveling over the feed-rollers themselves, it will be understood that they therefore do not exert as much tension on the fabric as would otherwise be the case if they were driven rollers instead of frictionally operated rollers as they are, and thus provide for minimum tension on the fabric. It will further be observed that the peculiar design of the machine, relative to the relationship of the operating parts (more especially the wrapping feature of the fabric about the winch-roller 27 and the frictional-feed-roller 39 and the free guide-roller 97) allows for positive feed and advancing of the material through the machine when the same is put into operation without the possibility of slipping between the material and the feeding mechanism; and thus it will here be understood that every turn of the driving-shaft 33 is communicated direct to the wrapping or winch-roller 27, the main feed-roller 28 and the auxiliary feed-roller 29, and causes them to turn simultaneously, resulting in a positive and constant advance of material through the machine, and since the register device mechanism is operated by the turning of the winch-roller, every such advance of material will be acounted for and registered by the recorder of the machine.

While the preferred embodiments of my invention have been described in detail, it will be understood that I do not wish to be limited to the particular construction set forth, since various changes in the form, material, proportions, and arrangement of parts, and in the details of construction may be resorted to without departing from the spirit and scope of the invention, or destroying any of the advantages contained in the same, heretofore described and defined in the subjoined claims.

What I claim is:—

1. A machine of the character described, comprising means for feeding cloth therethrough in open form, means for operating said means for feeding said cloth, means for measuring and registering the cloth fed through the machine, means for automatically stopping the machine when the supply of material is reaching the end of the run, and means for automatically cutting out the register member when the material engaging member thereof becomes disengaged from the material feeding through the machine.

2. A machine of the character described, comprising means for feeding material through the machine; means for measuring and registering the material fed through; automatic stopping means adapted to stop the machine when the supply of material is reaching the end of the run; means for automatically uncoupling the measuring and registering means when the material engaging member thereof becomes disengaged from the material feeding through the machine; and a rigid frame member supporting said aforesaid means.

3. A machine of the character described, comprising means for feeding material through the machine; means for measuring and registering the material fed through; automatic stopping means adapted to stop the machine when the supply of material is about to run out; means for automatically uncoupling the measuring and registering means when no material is in contact therewith; a rigid frame-member supporting said several aforesaid means; means for rotatably supporting the supply-bolt; and means for operating said feeding, measuring and rotatable bolt-supporting means.

4. A machine of the character described, comprising means for feeding material through the machine; means for measuring and registering the material fed through; automatic stopping means adapted to stop the machine when the supply of material is running out; means for automatically uncoupling the measuring and registering means when no material is in contact therewith; a rigid frame-member supporting said several aforesaid means; means for rotatably supporting the supply-bolt for unwinding the same; means for rotatably supporting the receiving-bolt for winding the same with the measured goods; and means for operating said feeding and measuring means, and said rotatable supply and receiving bolt-supporting means.

5. A machine of the character described, comprising means for rotatably supporting the supply-bolt, a winch member, rotatable and frictional means adapted to wrap the feeding material about said winch-member; feeding-rollers adapted to feed and advance the material through the machine; means for measuring and registering the amount of material fed through the machine; means for operating said rotatable supply bolt-supporting means, winch-member, feeding rollers and measuring means; means for automatically uncoupling said measuring and registering means when no material is in contact therewith; means for frictionally engaging said rotatable and frictional means with the material being fed in the machine; and means for driving said aforesaid operating means.

6. A machine of the character described, comprising means for rotatably supporting the supply-bolt; a winch-member, rotatable and frictional means adapted to wrap the feeding material about said winch-member; feeding-rollers adapted to feed and advance the material through the machine; means for measuring and registering the amount of material fed through the machine; means for operating said rotatable supply bolt-supporting means, winch-member, feeding-rollers and measuring means; means for automatically uncoupling said measuring and registering means when no material is in contact therewith; means for frictionally engaging said rotatable and frictional means with the material being fed in the machine; automatic tripping means associated with said rotatable and frictional means normally supported by the stretch of goods fed in the machine between the winch-member and the main feeding-roller; an electric circuit provided with a sounding apparatus and adapted to be closed by the action of the automatic tripping means when not in the normal position, for sounding said sounding apparatus; and means for driving said aforesaid operating means.

7. A machine of the character described, comprising means for rotatably supporting the supply-bolt; a winch-member; rotatable and frictional means adapted to wrap the feeding material about said winch-member; feeding-rollers adapted to feed and advance the material through the machine; means for measuring and registering the amount of material fed through the machine; means for operating said rotatable supply bolt-supporting means, winch-member, feeding-rollers and measuring means; means for automatically uncoupling said measuring and registering means when no material is in contact therewith; means for frictionally engaging said rotatable and frictional means with the material being fed in the machine; means for driving said aforesaid operating means; and means for controlling said driving means.

8. A machine of the character described, comprising means for rotatably supporting the supply-bolt; a winch-member; rotatable and frictional means adapted to wrap the feeding material about said winch-member; feeding-rollers adapted to feed and advance the material through the machine; means for measuring and registering the amount of material fed through the machine; means for rotatably supporting the receiving bolt-board for winding the measured material thereon; means for operating said rotatable supply-bolt-supporting means, receiving bolt-board supporting means, winch-member, feeding-rollers and measuring means; means for automatically uncoupling said measuring and registering means when no material is in contact therewith; means for frictionally engaging said rotatable and frictional means with the material being fed in the machine; and means for driving said aforesaid operating means.

9. A machine of the character described, comprising means for rotatably supporting the supply-bolt; a winch-member; rotatable and frictional means adapted to wrap the feeding material about said winch-member; feeding-rollers adapted to feed and advance the material through the machine; means for measuring and registering the amount of material fed through the machine; means for rotatably supporting the receiving bolt-board for winding the measured material thereon; means for operating said rotatable supply-bolt-supporting means, rotatable receiving bolt-board supporting means, winch-member, feeding-rollers and measuring means; means for automatically uncoupling said measuring and registering means when no material is being fed through the machine while the same is operating; means for frictionally engaging said rotatable and frictional means with the material being fed in the machine; automatic tripping means associated with said rotatable and frictional means normally supported by the stretch of goods fed in the machine between the winch-member and the main feeding-roller; an electric circuit provided with a sounding apparatus and adapted to be closed by the action of the automatic tripping means when not in the normal position, for sounding said sounding apparatus; means for driving said aforesaid operating means; and means for controlling said driving means.

10. A machine of the character described, comprising means for feeding cloth therethrough in open form; means for measuring and registering the cloth being fed therethrough; means for cutting off the measured portion of the cloth fed through the machine; and means for automatically disengaging and stopping said registering means when the supply of cloth in the machine has run out.

11. A machine of the character described, comprising means for feeding material through the machine; means for measuring and registering the material fed through; means for cutting off the measured portion of the cloth fed through the machine; automatic stopping means adapted to stop the machine when the supply of material is nearing the end of the run; means for automatically uncoupling the measuring and registering means when no material is feeding through the machine; and a rigid frame-member supporting said aforesaid means.

12. A machine of the character described, comprising means for feeding material through the machine; means for measuring and registering the material fed through; automatic stopping means adapted to stop the machine when the supply of material is nearing the end of the run; means for automatically uncoupling the measuring and registering means when no material is in working contact therewith; a rigid frame-member supporting said aforesaid means; means for rotatably supporting the supply-bolt for unwinding the same; means for rotatably supporting the receiving-bolt for winding the same with the measured goods; means for operating said feeding, measuring and registering means, and said rotatable supply and receiving bolt-supporting means; and means for cutting off the measured portion of the cloth fed through the machine.

13. A machine of the character described, comprising means for rotatably supporting the supply-bolt, a winch-member, rotatable and frictional means adapted to wrap the feeding material about said winch-member; feeding-rollers adapted to feed and advance the material through the machine; means for measuring and registering the amount of material fed through the machine; means for operating said rotatable supply bolt-supporting means, winch-member, feeding-rollers and measuring means; means for automatically uncoupling said measuring and registering means when no material is in working contact therewith while the machine is running idle; means for frictionally engaging said rotatable and frictional means with the material being fed in the machine; means for driving said aforesaid operating means; and means for cutting off the measured portion of the cloth fed through the machine.

14. A machine of the character described, comprising means for rotatably supporting the supply-bolt; a winch-member; rotatable and frictional means adapted to wrap the feeding material about said winch-member; feeding-rollers adapted to feed and advance the material through the machine; means for measuring and registering the amount of material fed through the machine; means for operating said rotatable supply bolt-supporting means, winch-member, feeding-rollers and measuring means; means for automatically uncoupling said measuring and registering means when no material is being fed through the machine while the same is operating; means for frictionally engaging said rotatable and frictional means with the material being fed in the machine; automatic tripping means associated with said rotatable and frictional means normally supported by the stretch of goods fed in the machine between the winch-member and the main feeding-roller; an electric circuit provided with a sounding apparatus and adapted to be closed by the action of the automatic tripping means when not in the normal position for sounding said sounding apparatus, means for driving said aforesaid operating means; and means for cutting off the measured portion of the cloth fed through the machine.

15. A machine of the character described, comprising a rigid frame-member provided with a recessed top; a transverse winch-member rotatably mounted in said frame-member; a transverse main feed-roller rotatably mounted in said frame-member; a transverse auxiliary feed-roller rotatably mounted in said frame-member; means for driving said winch-member main feed-roller and said auxiliary feed-roller; a transverse and rigid bridge member secured to said frame-member and provided with co-acting friction-rollers adapted to frictionally engage with said auxiliary feed-roller, and an upright guide-bearing intermediate the bridge thereof; a register member actuated by the winch-member and provided with a clutching member adapted to disengage the registering mechanism of said register member; a guide and tripping member adapted to slidably fit said guide-bearing of said bridge member and provided with friction rollers spaced apart from each other and adapted to support said tripping-member and positioned directly over the recesses provided therefor in the top of said frame-member; means connecting said tripping member and said clutching-member of said register-member; a transverse oscillating yoke-member provided with a frictional co-acting feed-roller adapted to frictionally engage with said main feed-roller; and an auxiliary oscillating yoke-member provided with a transverse roller rotatably mounted in said yoke-member.

16. A machine of the character described, comprising a rigid frame-member provided with a recessed top; a transverse winch member rotatably mounted in said frame-member; a transverse main feed-roller rotatably mounted in said frame-member; a transverse auxiliary feed-roller rotatably mounted in said frame-member; means for driving said winch-member, main feed-roller and said auxiliary feed-roller; a transverse and rigid bridge member secured to said frame-member and provided with co-acting friction rollers, adapted to frictionally engage with said auxiliary feed-roller, and an upright guide-bearing intermediate the bridge thereof; a register-member actuated by the winch-member and provided with a clutching member adapted to disengage the registering mechanism of said register-member; a guide and tripping member adapted to slidably fit said guide-bearing of said bridge member and provided with friction-rollers spaced apart from each other and adapted to support said tripping-member and positioned directly over the recesses provided therefor in the top of said frame-member; means connecting said tripping-member and said clutching-member of said register - member; a transverse oscillating yoke-member provided with a frictional co-acting feed-roller adapted to frictionally engage with said main feed-roller; an auxiliary oscillating yoke-member provided with a transverse roller rotatably mounted in said yoke-member; and coupling means connecting said first-mentioned yoke-member with the latter.

17. A machine of the character described, comprising a rigid frame-member provided with a recessed and slotted top; a transverse winch-member rotatably mounted in said frame-member; a transverse main feed-roller rotatably mounted in said frame-member; a transverse auxiliary feed-roller rotatably mounted in said frame-member; means for driving said winch-member, main feed-roller and said auxiliary feed-roller; a transverse and rigid bridge-member secured to said frame-member and provided with co-acting friction rollers adapted to frictionally engage with said auxiliary feed-roller, and an upright guide-bearing intermediate the bridge thereof; a register-member actuated by the winch-member and provided with a clutching-member adapted to disengage the registering mechanism of said register-member; a guide and tripping-member adapted to slidably fit said guide-bearing of said bridge-member and provided with friction rollers spaced apart from each other and adapted to support said tripping-member and positioned directly over the recesses provided therefor in the top of said frame-member; means connecting said tripping-member and said clutching-member of said register-member; a transverse oscillating yoke-member provided with a frictional co-acting feed-roller adapted to frictionally engage with said main feed-roller; an auxiliary oscillating yoke-member provided with a transverse roller rotatably mounted in said yoke-member; and a transverse cutter-member positioned to operate in the slot of the top of said frame-member.

18. A machine of the character described, comprising a rigid frame-member provided with a recessed top; a transverse winch-member rotatably mounted in said frame-member; a transverse main feed-roller rotatably mounted in said frame-member; a transverse auxiliary feed-roller rotatably mounted in said frame-member; means for driving said winch-member, main feed-roller and said auxiliary feed-roller; a transverse and rigid bridge-member secured to said frame-member and provided with co-acting friction-rollers adapted to frictionally engage with said auxiliary feed-roller, and an upright guide-bearing intermediate the bridge thereof; a register-member actuated by the winch-member and provided with a clutching-member adapted to disengage the registering mechanism of said register-member; a guide and tripping-member adapted to slidably fit said guide-bearing of said bridge-member and provided with friction-rollers spaced apart from each other and adapted to support said tripping-member and positioned directly over the recesses provided therefor in the top of said frame-member; means connecting said tripping member and said clutching-member of said register-member; a transverse oscillating yoke-member provided with a frictional co-acting feed-roller adapted to frictionally engage with said main feed-roller; an auxiliary oscillating yoke-member provided with a transverse roller rotatably mounted in said yoke-member; and means for operating and shifting said first-mentioned oscillating yoke-member.

19. A machine of the character described, comprising a rigid frame-member provided with a recessed top; a transverse winch-member rotatably mounted in said frame-member; a transverse main feed-roller rotatably mounted in said frame-member; a transverse auxiliary feed-roller rotatably mounted in said frame-member; means for driving said winch-member, main feed-roller and said auxiliary feed-roller; a transverse and rigid bridge-member secured to said frame-member and provided with co-acting friction-rollers adapted to frictionally engage with said auxiliary feed-roller, and an upright guide-bearing intermediate the bridge thereof; a register-member actuated by the winch-member and provided with a clutching-member adapted to disengage the registering mechanism of said register-member; a guide and tripping member adapted to slidably fit said guide-bearing of said bridge member and provided with friction rollers spaced apart from each other and adapted to support said tripping-member and positioned directly over the recesses provided therefor in the top of said frame-member; means connecting said tripping member and said clutching-member of said register-member; a transverse oscillating yoke-member provided with a frictional co-acting feed-roller adapted to frictionally engage with said main feed-roller; an auxiliary oscillating yoke-member provided with a transverse roller rotatably mounted in said yoke-member; and means for controlling said first-mentioned driving means.

20. A machine of the character described, comprising a rigid frame-member provided with a recessed top; a transverse winch-member rotatably mounted in said frame-member; a transverse main feed-roller rotatably mounted in said frame-member; a transverse auxiliary feed-roller rotatably mounted in said frame-member; means for driving said winch-member, main feed-roller and said auxiliary feed-roller; a transverse and rigid bridge-member secured to said frame-member and provided with co-acting friction rollers, adapted to frictionally engage with said auxiliary feed-roller, and an upright guide-bearing intermediate the bridge thereof; a register-member actuated by the winch-member and provided with a clutching-member adapted to disengage the registering mechanism of said recorder-member; a guide and tripping member adapted to slidably fit said guide-bearing of said bridge-member and provided with friction-rollers spaced apart from each other and adapted to support said tripping-member and positioned directly over the recesses provided therefor in the top of said frame-member; means connecting said tripping-member and said clutching-member of said register-member; a transverse oscillating yoke-member provided with a frictional co-acting feed-roller adapted to frictionally engage with said main feed-roller; an auxiliary oscillating yoke-member provided with a transverse roller rotatably mounted in said yoke-member; coupling means connecting said first-mentioned yoke-member with the latter; and means for driving said winch-member, main feed-roller and auxiliary feed-roller.

21. A machine of the character described, comprising a rigid frame-member provided with a recessed top; a transverse winch-member rotatably mounted in said frame-member; a transverse main feed-roller rotatably mounted in said frame-member; a transverse auxiliary feed-roller rotatably mounted in said frame-member; means for driving said winch-member, main feed-roller and said auxiliary feed-roller; a transverse and rigid bridge-member secured to said frame-member and provided with co-acting friction rollers adapted to frictionally engage with said auxiliary feed-roller, and an upright guide-bearing intermediate the bridge thereof; a register-member actuated by the winch-member and provided with a clutching-member adapted to disengage the registering mechanism of said register-member; a guide and tripping member adapted to slidably fit said guide-bearing of said bridge-member and provided with friction-rollers spaced apart from each other and adapted to support said tripping-member and positioned directly over the recesses provided therefor in the top of said frame-member; means connecting said tripping-member and said clutching-member of said register-member; a transverse oscillating yoke-member provided with a frictional co-acting feed-roller adapted to frictionally engage with said main feed-roller; an auxiliary oscillating yoke-member provided with a transverse roller rotatably mounted in said yoke-member; coupling means connecting said first-mentioned yoke-member with the latter; and means for controlling said driving means.

22. A machine of the character described, comprising a rigid frame-member provided with a recessed and slotted top; a transverse winch-member rotatably mounted in said frame-member; a transverse main feed-roller rotatably mounted in said frame-member; a transverse auxiliary feed-roller rotatably mounted in said frame-member, means for driving said winch-member; main feed-roller and said auxiliary feed-roller; a transverse and rigid bridge-member secured to said frame-member and provided with co-acting friction rollers adapted to frictionally engage with said auxiliary feed-roller, and an upright guide-bearing intermediate the bridge thereof; a register-member actuated by the winch-member and provided with a clutching-member adapted to disengage the registering mechanism of said register-member; a guide and tripping-member adapted to slidably fit said guide-bearing of said bridge-member and provided with friction rollers spaced apart from each other and adapted to support said tripping-member and positioned directly over the recesses provided therefor in the top of said frame-member; means connecting said tripping-member and said clutching-member of said register-member; a transverse oscillating yoke-member provided with a frictional co-acting feed-roller adapted to frictionally engage with said main feed-roller; an auxiliary oscillating yoke-member provided with a transverse roller rotatably mounted in said yoke-member; a transverse cutter-member positioned to operate in the slot of the top of said frame-member; and means for driving said winch-member, main feed-roller and auxiliary feed-roller.

23. A machine of the character described, comprising a rigid frame-member provided with a recessed and slotted top; a transverse winch-member rotatably mounted in said frame-member; a transverse main feed-roller rotatably mounted in said frame-member; a transverse auxiliary feed-roller rotatably mounted in said frame-member; means for driving said winch-member, main feed-roller and said auxiliary feed-roller; a transverse and rigid bridge-member secured to said frame-member and provided with co-acting friction rollers adapted to frictionally engage with said auxiliary feed-roller, and an upright guide-bearing intermediate the bridge thereof; a register-member actuated by the winch-member and provided with a clutching member adapted to disengage the registering mechanism of said register-member; a guide and tripping-member adapted to slidably fit said guide-bearing of said bridge-member and provided with friction rollers spaced apart from each other and adapted to support said tripping-member and positioned directly over the recesses provided therefor in the top of said frame-member; means connecting said tripping-member and said clutching-member of said register-member; a transverse oscillating yoke-member provided with a frictional co-acting feed-roller adapted to frictionally engage with said main feed-roller; an auxiliary oscillating yoke-member provided with a transverse roller rotatably mounted in said yoke-member; a transverse cutter-member positioned to operate in the slot of the top of said frame-member; and means for controlling said driving means.

24. A machine of the character described, comprising a rigid frame-member provided with a recessed top; a transverse winch-member rotatably mounted in said frame-member; a transverse main feed-roller rotatably mounted in said frame-member; a transverse auxiliary feed-roller rotatably mounted in said frame-member; a transverse and rigid bridge-member secured to said frame-member and provided with co-acting friction rollers adapted to frictionally engage with said auxiliary feed-roller, and an upright guide-bearing intermediate the bridge thereof; a register-member actuated by the winch-member and provided with a clutching-member adapted to disengage the registering mechanism of said register-member; a guide and tripping-member adapted to slidably fit said guide-bearing of said bridge-member and provided with friction rollers spaced apart from each other and adapted to support said tripping-member and positioned directly over the recesses provided therefor in the top of said frame-member; means connecting said tripping-member and said clutching member of said register-member; a transverse oscillating yoke-member provided with a frictional co-acting feed-roller adapted to frictionally engage with said main feed-roller; an auxiliary oscillating yoke-member provided with a transverse roller rotatably mounted in said yoke-member; a driving shaft rotatably coupled with said winch-member, main feed-roller and auxiliary feed-roller and adapted to rotate the same at the same peripheral rate of speed; and an electric motor coupled with said driving shaft for rotating the same.

25. A machine of the character described, comprising a rigid frame-member provided with a recessed top; a transverse winch-member rotatably mounted in said frame-member; a transverse main feed-roller rotatably mounted in said frame-member; a transverse auxiliary feed-roller rotatably mounted in said frame-member; a transverse and rigid bridge-member secured to said frame-member and provided with co-acting friction-rollers adapted to frictionally engage with said auxiliary feed-roller, and an upright guide-bearing intermediate the bridge thereof; a register-member actuated by the winch-member and provided with a clutching-member adapted to disengage the registering mechanism of said register member; a guide and tripping-member adapted to slidably fit said guide-bearing of said bridge-member and provided with friction rollers spaced apart from each other and adapted to support said tripping-member and positioned directly over the recesses provided therefor in the top of said frame-member; means connecting said tripping-member and said clutching-member of said register-member; a transverse oscillating yoke-member provided with a frictional co-acting feed-roller adapted to frictionally engage with said main feed-roller; an auxiliary oscillating yoke-member provided with a transverse roller rotatably mounted in said yoke-member; a driving shaft rotatably coupled with said winch-member, main feed-roller and auxiliary feed-roller and adapted to rotate the same at the same peripheral rate of speed; an electric motor coupled with said driving-shaft for rotating the same; and a motor friction clutch-member adapted to control the operations of said motor.

26. A machine of the character described, comprising a rigid frame-member provided with a recessed top; a transverse winch-member rotatably mounted in said frame-member; a transverse main feed-roller rotatably mounted in said frame-member; a transverse auxiliary feed-roller rotatably mounted in said frame-member; a transverse and rigid bridge-member secured to said frame-member and provided with co-acting friction-rollers adapted to frictionally engage with said auxiliary feed-roller, and an upright guide-bearing intermediate the bridge thereof; a register-member actuated by the winch-member and provided with a clutching-member adapted to disengage the registering mechanism of said register-member; a guide and tripping-member adapted to slidably fit said guide-bearing of said bridge-member and provided with friction rollers spaced apart from each other and adapted to support said tripping-member, and positioned directly over the recesses provided therefor in the top of said frame-member; means connecting said tripping-member and said clutching-member of said register-member; a transverse oscillating yoke-member provided with a frictional co-acting feed-roller adapted to frictionally engage with said main feed-roller; an auxiliary oscillating yoke-member provided with a transverse roller rotatably mounted in said yoke-member; a driving shaft rotatably coupled with said winch-member, main feed-roller and auxiliary feed-roller and adapted to rotate the same at the same peripheral rate of speed; an electric motor coupled with said driving-shaft for rotating the same; a motor friction clutch-member adapted to control the operations of said motor; a main switch-member adapted to couple said motor with the mains of the circuit operating the same; an auxiliary electric circuit provided with a switch-opening-member adapted to open said main switch-member; and an automatic friction tripping-member adapted to "close" said auxiliary circuit for opening said main switch-member when the end of the material fed in the machine approaches said tripping-member for automatically stopping the machine.

27. A machine of the character described, comprising a rigid frame-member provided with a recessed and slotted top; a transverse winch-member rotatably mounted in said frame-member; a transverse main feed-roller rotatably mounted in said frame-member; a transverse auxiliary feed-roller rotatably mounted in said frame-member; means for driving said winch-member, main feed-roller and said auxiliary feed-roller; a transverse and rigid bridge-member secured to said frame-member and provided with co-acting friction rollers, adapted to frictionally engage with said auxiliary feed-roller, and an upright guide-bearing intermediate the bridge thereof; a register-member actuated by the winch-member and provided with a clutching-member adapted to disengage the registering mechanism of said register-member; a guide and tripping-member adapted to slidably fit said guide-bearing of said bridge-member and provided with friction rollers spaced apart from each other and adapted to support said tripping-member and positioned directly over the recesses provided therefor in the top of said frame-member; means connecting said tripping-member and said clutching-member of said register-member; a transverse oscillating yoke-member provided with a frictional co-acting feed-roller adapted to frictionally engage with said main feed-roller; an auxiliary oscillating yoke-member provided with a transverse roller rotatably mounted in said yoke-member; a transverse cutter-member positioned to operate in the slot of the top of said frame-member; a main switch-member adapted to couple said motor with the mains of the circuit operating the same; an auxiliary electric circuit provided with a switch-opening-member adapted to open said main switch-member; and an automatic friction tripping-member adapted to "close" said auxiliary circuit for opening said main switch-member when the end of the material fed in the machine approaches said tripping-member for automatically stopping the machine.

28. A machine of the character described, comprising a rigid frame-member provided with a recessed top; a transverse winch-member rotatably mounted in said frame-member; a transverse main feed-roller rotatably mounted in said frame-member; a transverse auxiliary feed-roller rotatably mounted in said frame-member; means for rotatably supporting the supply-bolt; means for rotatably supporting the receiving bolt; a transverse and rigid bridge-member secured to said frame-member and provided with coacting friction rollers, adapted to frictionally engage with said auxiliary feed-roller, and an upright guide-bearing intermediate the bridge thereof; a register-member actuated by the winch-member and provided with a clutching-member adapted to disengage the registering mechanism of said register-member; a guide and tripping-member adapted to slidably fit said guide-bearing of said bridge-member and provided with friction rollers spaced apart from each other and adapted to support said tripping-member and positioned directly over the recesses provided therefor in the top of said frame-member; means connecting said tripping-member and said clutching-member of said register-member; a transverse oscillating yoke-member provided with a frictional co-acting feed-roller adapted to frictionally engage with said main feed-roller; an auxiliary oscillating yoke-member provided with a transverse roller rotatably mounted in said yoke-member; and a driving shaft rotatably coupled with said winch-member, main feed-roller, auxiliary feed-roller, and rotatable supply and receiving bolt-supporting means, and adapted to rotate said winch-member, main feed-roller and auxiliary feed-roller all at the same peripheral rate of speed.

29. A machine of the character described, comprising a rigid frame-member provided with a recessed top; a transverse winch-member rotatably mounted in said frame-member; a transverse auxiliary feed-roller rotatably mounted in said frame-member; means for rotatably supporting the supply-bolt; means for rotatably supporting the receiving bolt; a transverse and rigid bridge-member secured to said frame-member and provided with co-acting friction rollers, adapted to frictionally engage with said auxiliary feed-roller, and an upright guide-bearing intermediate the bridge thereof; a register-member actuated by the winch-member and provided with a clutching-member adapted to disengage the registering mechanism of said register-member; a guide and tripping-member adapted to slidably fit said guide-bearing of said bridge-member and provided with friction rollers spaced apart from each other and adapted to support said tripping-member and positioned directly over the recesses provided therefor in the top of said frame-member; means connecting said tripping-member and said clutching-member of said register-member; a transverse oscillating yoke-member provided with a frictional co-acting feed-roller adapted to frictionally engage with said main feed-roller; an auxiliary oscillating yoke-member provided with a transverse roller rotatably mounted in said yoke-member; a driving-shaft rotatably coupled with said winch-member, main feed-roller, auxiliary therefor in the top of said frame-member; ceiving bolt-supporting means, and adapted to rotate said winch-member, main feed-roller and auxiliary feed-roller all at the same peripheral rate of speed; a main switch-member adapted to couple said motor with the mains of the circuit operating the same;

an auxiliary electric circuit provided with a switch-opening-member adapted to open said main switch-member; and an automatic friction tripping-member adapted to "close" said auxiliary circuit for opening said main switch-member when the end of the material fed in the machine approaches said tripping-member for automatically stopping the machine.

30. In a machine of the character described, the combination of an automatic stopping device, comprising an auxiliary electric circuit; a magnet coupled in said circuit; a magnet-bar supported on a pivoted bracket and provided with a latch-member; a main switch member, coupling the motor of the machine with the supply mains, provided with a spring actuated bar-member adapted to engage with said latch-member and also to force the main switch open; a spring actuated tripping-member adapted to close said auxiliary circuit for energizing said magnet to release said bar-member for opening the main switch.

31. In a machine of the character described, the combination of a register and an automatic cut-out therefor, comprising a rigid guide-member; a spring actuated tripping-member slidably set in said guide-member and provided with supporting rollers spaced apart from each other and adapted to be normally supported by the material fed through the machine; a shifting clutch-member; and means coupling said clutch-member with said tripping member adapted to uncouple said clutch-member when said tripping-member is not supported as aforesaid.

NATHAN DAVIS.

Witnesses:
 B. H. CHERTOK,
 D. LICHTENSTEIN.

Copies of this patent may be obtained for five cents each, by addressing the "Commissioner of Patents, Washington, D. C."